March 11, 1930. H. DIELMANN 1,750,260
RESILIENT WHEEL FOR VEHICLES
Filed March 24, 1927
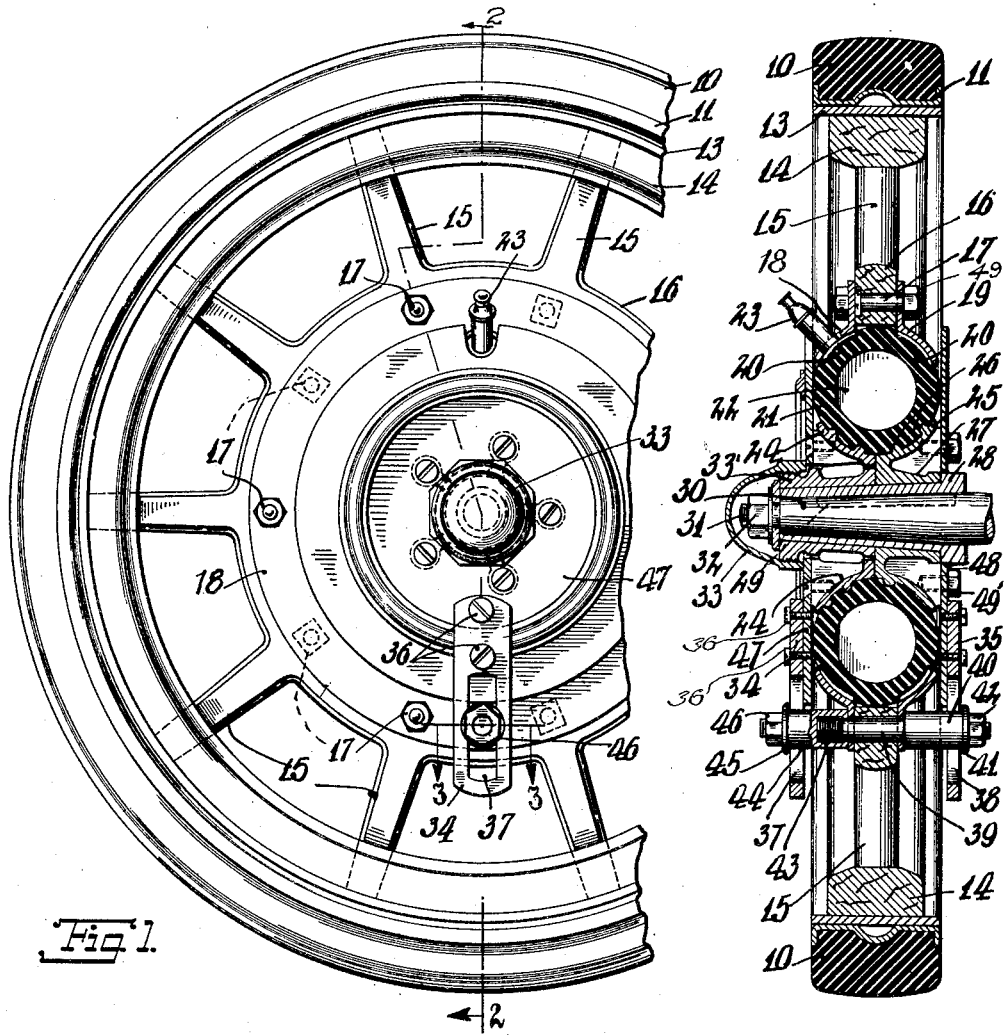
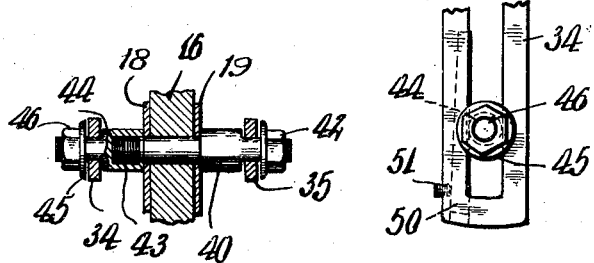
Fig. 1. Fig. 2. Fig. 3. Fig. 4.
INVENTOR
Henry Dielmann
BY
ATTORNEY Patented Mar. 11, 1930

1,750,260

UNITED STATES PATENT OFFICE

HENRY DIELMANN, OF WOODHAVEN, NEW YORK

RESILIENT WHEEL FOR VEHICLES

Application filed March 24, 1927. Serial No. 177,937.

This invention relates to a new and useful device in the nature of a resilient wheel particularly adapted for use in connection with motor vehicles for the purpose of providing a resilient wheel having easy riding qualities.

An object of the invention is to provide a resilient wheel, puncture proof.

A further object of the invention is to provide a resilient wheel of novel construction and arrangement of parts, hereinafter more fully described, claimed and illustrated in the accompanying drawing.

Fig. 1 is a fragmentary front elevational view of my improved resilient wheel.

Fig. 2 is a vertical central sectional view taken on the line 2—2 of Figure 1.

Fig. 3 is a fragmentary transverse sectional view taken on the line 3—3 of Figure 1.

Fig. 4 is an enlarged fragmentary view illustrating a further development of the driving connection member, as embodied in my improved device.

As here embodied my resilient wheel comprises a resilient member 10, or tire of solid rubber. The resilient member 10 is molded or otherwise attached to the rim 11, as is common to tires of this nature. The rim 11 is preferably shrunk on the felloe band 13, attached to the felloe 14. The felloe 14, is of common construction, preferably of wood. The spokes 15, are attached to the felloe 14, and are extended radially inwardly therefrom. The spokes 15 are provided with a ring shaped portion 16. The ring shaped portion 16 of the spokes 15 has formed therein apertures adapted to receive the studs 17, bolts, or the like which are provided with nuts 49 as a means of attaching the outer tube retaining members 18 and 19 thereto. The outer tube retaining members 18 and 19 are of ring shaped construction formed concaved, and provided with radial ribbed portions 20, adapted to engage in similar shaped radial recesses formed in the tube 21. The tube 21 is of continuous hollow construction, of comparatively heavy wall, having a chamber 22 or air space. The tube 21 is provided with the usual stem 23, valve and dust cover, as a means of inflating the tube 21, to any desired predetermined pressure of air. The inner tube retaining members 24 and 25, are of ring shaped construction, formed concaved, and provided with annular ribbed portions 26, adapted to engage in similar shaped annular recesses formed in the tube 21. The inner tube retaining member 25 is provided with a side extended element 27, which is engaged on the hub 28, which is keyed, as at 29, to the axle shaft 30. The hub 28 is provided with the usual threaded extremity 31, adapted to receive the threaded member 32, a nut or the like, as a means of securing the hub 28 to the axle shaft 30. The sleeve member 33' is adapted to engage over the outer portion of the hub 28, as a means of securing the inner tube retaining member 24, in place. The hub cap 33 of usual construction is threadedly attached to the sleeve member 33' which forms the side extended portion; of the inner tube retaining member 24. The driving connection members 34 and 35 are attached as at 36 by screws, bolts, or the like, to ring shaped members 47 and 48 which are attached to the inner tube retaining members 24 and 25 by bolts 49', and are extended outwardly from the center portion of the wheel. The extended portions of the driving connection members 34 and 35 are provided with elongated apertures 37 and 38, respectively. The stud 39 is adapted to engage in an aperture formed in the above mentioned ring shaped portion 16 of the spokes 15, and in each of the outer tube retaining members 18 and 19. The stud 39 is provided with an enlarged portion 40, adapted to slidably engage in the elongated aperture 38 of the driving connection member 35. The collar 41 is attached to the stud 39, by means of the threaded member 42, a nut or the like, threadedly attached to one extremity of the stud 39. The stud 39 is provided at the other end with a threaded extremity 43, as a means of removably attaching the cylindrical member 44 thereto. The cylindrical member 44 is adapted to slidably engage in the elongated aperture 37 formed in the driving connection member 34. The collar 45 is attached to the cylindrical member 44, by means of the threaded member 46, a nut or the like, threadedly attached to the extremity of the cylindrical member 44. The latter described construction is such as will permit the above mentioned tube 21, to be supported by the tire 10, so as to provide a certain amount of free movement so as to provide a resilient wheel. It should be understood that the tube 21 is secured in the above mentioned inner and outer tube retaining members, 18 and 19, 24 and 25, by the ring shaped members 47 and 48, attached to the inner tube retaining members 24 and 25, by the bolts 49', screws or the like.

In Figure 4 of the accompanying drawing, I have shown the driving connection member 34, provided with an elongated aperture adapted to slidably receive the tapered member 50, adapted to more securely engage the cylindrical member 44. The threaded member 51, is positioned in the driving connection member 34, as a means of holding the tapered member 50 in place.

Having thus described my invention what I claim as new and desire to protect by Letters Patent of the United States is as follows:

1. In a resilient wheel of the class described, a driving connection member provided with an elongated aperture adapted to slidably receive a tapered member, said tapered member adapted to engage a cylindrical member, a means for securing the said tapered member in the said driving connection member.

2. In a resilient wheel of the class described, a driving connection member for attachment on ring shaped members attached on inner tube retaining members, and provided with an elongated aperture, a tapered member slidably received in the said aperture, a means for securing the tapered member in the said driving connection member, and a cylindrical member passing thru said aperture and engaged against said tapered member, and arranged for engagement in a ring shaped portion connected with an outer traction rim, the securing means for the tapered member consisting of a threaded member engaged in the driving connection member and abutting the tapered member.

In testimony whereof I have affixed my signature.

HENRY DIELMANN.